US009744933B1

(12) United States Patent
Rao et al.

(10) Patent No.: US 9,744,933 B1
(45) Date of Patent: Aug. 29, 2017

(54) ROTATABLE SEAT ENERGY ABSORPTION (71) Applicant: Ford Global Technologies, LLC, Dearborn, MI (US)

(72) Inventors: Manoharprasad K. Rao, Novi, MI (US); Mark A. Cuddihy, New Boston, MI (US); Saeed David Barbat, Novi, MI (US); Srinivasan Sundararajan, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/055,745

(22) Filed: Feb. 29, 2016

(51) Int. Cl.
*B60R 21/18* (2006.01)
*B60R 22/26* (2006.01)
*B60R 22/34* (2006.01)
*B60R 22/12* (2006.01)
*B60R 21/207* (2006.01)
*B60R 21/015* (2006.01)
*B60R 21/0136* (2006.01)
*B60N 2/14* (2006.01)
*B60R 21/231* (2011.01)
(Continued)

(52) U.S. Cl.
CPC .............. *B60R 21/18* (2013.01); *B60N 2/143* (2013.01); *B60R 21/0136* (2013.01); *B60R 21/01554* (2014.10); *B60R 21/207* (2013.01); *B60R 21/23138* (2013.01); *B60R 22/12* (2013.01); *B60R 22/26* (2013.01); *B60R 22/34* (2013.01); *B60N 2002/022* (2013.01); *B60R 2021/0006* (2013.01); *B60R 2021/0032* (2013.01); *B60R 2021/23107* (2013.01); *B60R 2021/23146* (2013.01)

(58) Field of Classification Search
CPC ................................ B60N 2/143; B60R 21/18
See application file for complete search history.

(56) References Cited

U.S. PATENT DOCUMENTS

| 5,658,051 A | 8/1997 | Vega et al. |
| 6,457,694 B1 | 10/2002 | Haynes et al. |
| 6,655,745 B2 | 12/2003 | Fohrenkamm et al. |

(Continued)

FOREIGN PATENT DOCUMENTS

| DE | 4011227 A1 * | 10/1991 | ............. B60N 2/143 |
| DE | 19935737 A1 * | 2/2001 | ............. B60R 21/18 |

(Continued)

OTHER PUBLICATIONS

Filo, Paul and Lubega, Isaac, "Design of interior for a self-driving car", Chalmers University of Technology, Gothenburg, Sweden 2015.

(Continued)

*Primary Examiner* — Nicole Verley
(74) *Attorney, Agent, or Firm* — Frank A. MacKenzie; Bejin Bieneman PLC (57) ABSTRACT A vehicle seat is rotatable about an axis perpendicular to a vehicle floor from a forward-facing position to a rear-facing position. The seat includes a seat bottom and a seat back. A seat belt assembly extends at least partially from the seat back. At least one airbag is incorporated into the seat belt assembly and is deployable when the vehicle seat is rotated to at least one of the rear-facing position and a position between the forward-facing position and the rear-facing position.

19 Claims, 6 Drawing Sheets

(51) Int. Cl.
  *B60R 21/00* (2006.01)
  *B60N 2/02* (2006.01)

(56) References Cited

U.S. PATENT DOCUMENTS

| | | | |
|---|---|---|---|
| 6,769,716 B2 | 8/2004 | Rouhana et al. | |
| 6,773,075 B2 | 8/2004 | Rouhana et al. | |
| 7,195,092 B2 | 3/2007 | Wu et al. | |
| 7,677,598 B1 | 3/2010 | Ryan et al. | |
| 7,926,839 B1 * | 4/2011 | Mothaffar | B60R 21/18 280/730.1 |
| 8,016,318 B2 * | 9/2011 | Nezaki | B60N 2/002 280/733 |
| 8,016,362 B2 * | 9/2011 | Itoga | B60R 21/18 280/733 |
| 8,104,790 B2 * | 1/2012 | Nezaki | B60R 21/18 280/733 |
| 8,888,127 B2 * | 11/2014 | Santana-Gallego | B60R 21/18 280/733 |
| 9,073,574 B2 | 7/2015 | Cuddihy et al. | |
| 9,150,178 B1 | 10/2015 | Jayasuriya et al. | |
| 2001/0045730 A1 * | 11/2001 | Hirose | B60R 21/18 280/733 |
| 2003/0137180 A1 | 7/2003 | Rouhana et al. | |
| 2003/0168837 A1 * | 9/2003 | Schneider | B60R 21/18 280/733 |
| 2005/0253433 A1 * | 11/2005 | Brown | B60N 2/06 297/283.3 |
| 2006/0208471 A1 * | 9/2006 | Sundararajan | B60R 21/18 280/733 |
| 2010/0025972 A1 * | 2/2010 | Nezaki | B60R 21/18 280/730.1 |
| 2015/0054263 A1 * | 2/2015 | Renaudin | B60R 21/16 280/728.2 |
| 2015/0142245 A1 * | 5/2015 | Cuddihy | B60N 2/143 701/23 |
| 2015/0367800 A1 * | 12/2015 | Zhang | B60R 22/24 280/733 |

FOREIGN PATENT DOCUMENTS

| | | | | |
|---|---|---|---|---|
| DE | 10246981 B3 * | 3/2004 | | B60N 2/01 |
| DE | 10319953 A1 * | 8/2005 | | B60R 21/18 |
| EP | 1132261 A1 * | 9/2001 | | B60N 2/4235 |
| GB | 2245150 A * | 1/1992 | | B60R 21/18 |
| JP | EP 1101660 A1 * | 5/2001 | | B60R 21/18 |
| JP | EP 1568549 A1 * | 8/2005 | | B60R 21/231 |
| JP | 4122904 B2 * | 7/2008 | | |

OTHER PUBLICATIONS

Bostrom, Ola, et al., "Seat Integrated 3 Point Belt With Reversed Geometry and an Inboard Torso Side-Support Airbag for Improved Protection in Rollover," Paper No. 05-0204.

* cited by examiner

ROTATABLE SEAT ENERGY ABSORPTION

BACKGROUND

Energy absorbing devices, such as airbags, may absorb energy during a vehicle impact. Airbags are located throughout the passenger compartment of the vehicle and are deployed in response to detecting the impact. For example, airbags are located in the steering wheel, the instrument cluster, etc. Traditional airbag locations assume an unchanging seat arrangement.

DETAILED DESCRIPTION

A vehicle with a traditional seat arrangement would have all seats facing the same direction. Autonomous vehicles, however, permit non-traditional seat arrangements. In an autonomous vehicle, some seats, such as the front seats, may be rotated to face, e.g., the rear of the vehicle. Rotating the seats, however, may move the passenger in the seat away from one or more airbags.

Rather than incorporate additional airbags into the passenger compartment to account for every possible seat configuration, one solution is to incorporate one or more passive restraints, such as airbags, bolsters, seatbelts, etc., into the seat itself. Thus, the passive restraint remains fixed to the orientation of the seat, providing impact absorption regardless of the seat configuration. One solution, therefore, may include incorporating a seat belt assembly into a seat back of a rotatable seat and incorporating an airbag into the seat belt assembly. The airbag may be deployable when the seat is in a rear-facing position.

Figure 1:
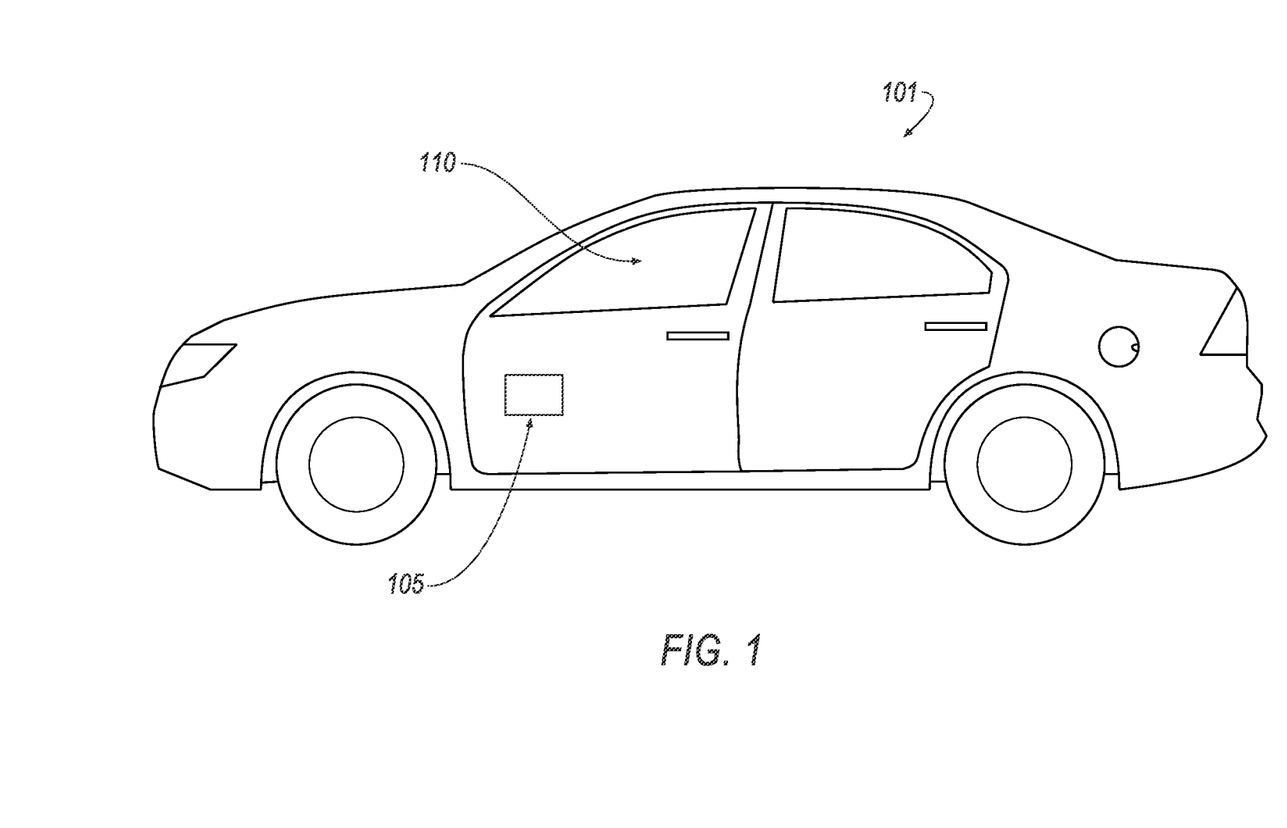
FIG. 1 is an exemplary diagram of a vehicle with a system for deploying airbags incorporated into rotatable seats.

FIG. 1 illustrates an example vehicle 101. The vehicle 101 includes a computing device 105 and a seat 110. The computing device 105 includes a processor and a memory. The computing device 105 may be programmed to output a control signal to deploy a passive restraint, e.g., an airbag, a bolster, etc. The computing device 105 is generally programmed to communicate over a controller area network (CAN) bus or the like. Via the CAN bus, OBD-II, and/or other wired or wireless mechanisms, e.g., WiFi, Bluetooth, or the like, the computing device 105 may transmit messages to various devices in a vehicle 101, e.g., airbags 150, 160 discussed below, and/or receive messages from the various devices, e.g., controllers, actuators, sensors, etc., including data collectors. Alternatively or additionally, in cases where the computing device 105 actually comprises multiple devices, the CAN bus or the like may be used for communications between devices represented as the computing device 105 in this disclosure.

Figure 2:
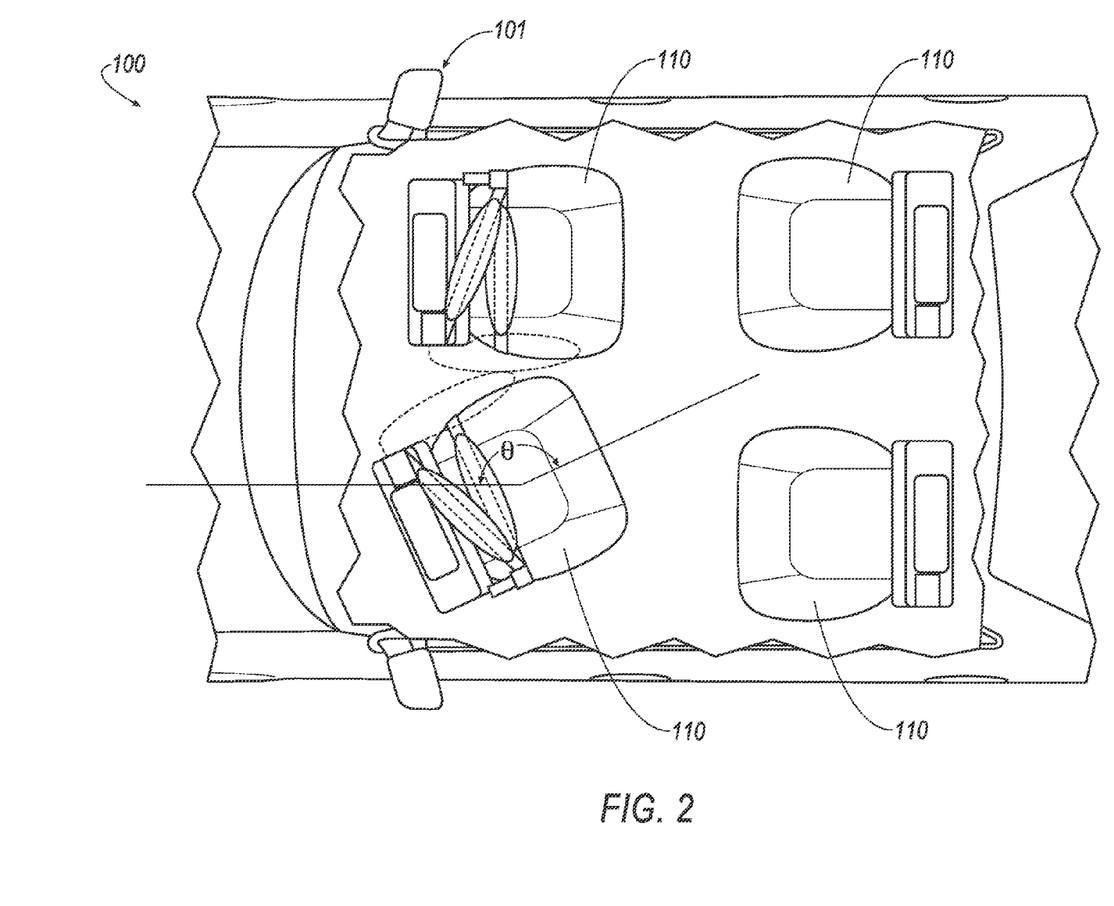
FIG. 2 is a plan view of the passenger compartment of the vehicle of FIG. 1, including rotatable seats.

FIG. 2 illustrates a passenger compartment of the vehicle 101 including the system 100. The vehicle 101 includes multiple seats 110. Each seat 110 supports a vehicle occupant during operation of the vehicle 101. For an autonomous vehicle, each seat 110 may be positioned in the vehicle 101 anywhere in the passenger compartment, e.g., an operator's side, a passenger's side. etc.

At least one of the seats 110 is rotatable about an axis perpendicular to a vehicle floor to an angle $\theta$. As shown in FIG. 2, the seat 110 may start in a forward-facing position, i.e., facing the direction of forward vehicle motion. The seat 110 may then be rotated to an angle $\theta$ relative to the forward-facing position. When the angle $\theta=180°$, i.e., the seat 110 has rotated by one-half revolution, the seat 110 faces the rear of the vehicle 101 and is in the rear-facing position. The seat 110 may be secured at any angle $\theta$ to a position between the forward-facing position and the rear-facing position. The seat 110 rotates on a rotation mechanism, e.g., a circle gear assembly, configured to rotate the seat 110 to the angle $\theta$.

Figure 3:
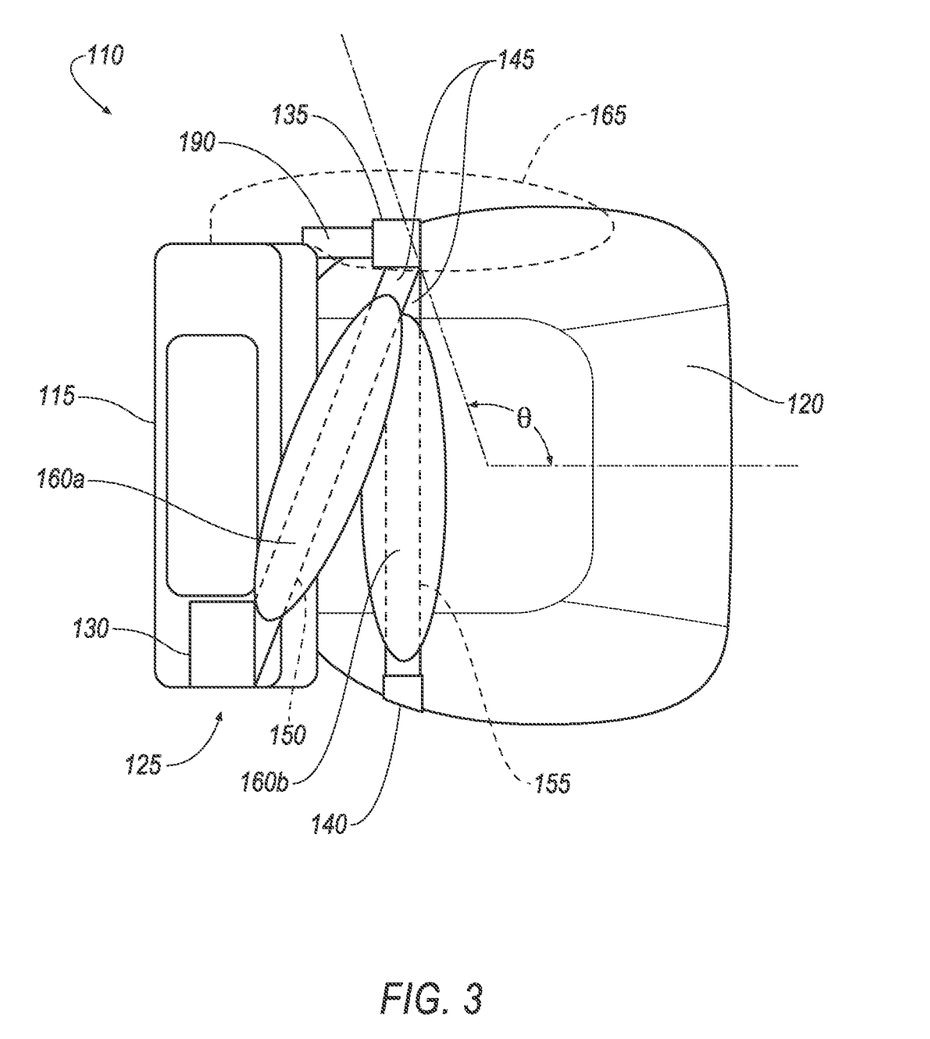
FIG. 3 is a plan view of an example rotatable seat that may be incorporated into the passenger compartment of the vehicle illustrated in FIG. 2.

FIG. 3 illustrates an exemplary rotatable seat 110. The seat includes a seat back 115. The seat back 115 provides support for the vehicle occupant and may house at least part of a seat belt assembly 125. The seat back 115 includes a support structure 170 and a cushion 175. The seat back 115 may rotate, with the seat bottom 120, about the axis to the angle $\theta$.

The seat 110 further includes a seat bottom 120. The seat bottom 120 is attached to the seat back 115 and provides support for the vehicle occupant. The seat bottom 120 may house at least part of the seat belt assembly 125. The seat bottom 120 includes a support structure 180 and a cushion 185. The seat bottom 120 may rotate about the axis to the angle $\theta$.

The seat 110 includes the seat belt assembly 125. The seat belt assembly 125 absorbs impact energy from the vehicle occupant and secures the occupant to the seat back 115 and seat bottom 120. The seat belt assembly 125 includes a retractor 130, a first anchor 135, and a second anchor 140. The seat belt assembly 125 may be installed at least in part in the seat back 115 and/or the seat bottom 120. The seat belt assembly 125 may extend at least partially from the seat back 115. The seat belt assembly 125 may be a 3-point seat belt system, wherein the 3 points are the retractor 130, the first anchor 135, and the second anchor 140.

The seat belt assembly 125 includes the retractor 130. The retractor 130 houses a webbing 145 and tightens the webbing 145 against the occupant, i.e., controls the payout of the webbing 145. The retractor 130 may be installed and/or integrated into the seat back 115. The retractor 130 may extend from the seat back 115, e.g., may be attached to the seat back support structure 170. The retractor 130 may be of a known type. e.g., a pretensioner.

The seat belt assembly 125 includes the first anchor 135. The first anchor 135 secures the webbing 145 to the seat 110 while allowing the webbing to move to and from the retractor 130. The first anchor 135 provides the second point of the 3-point belt system. The first anchor 135 may be installed and/or integrated into at least one of the seat back 115 and/or the seat bottom 120. That is, the first anchor 135 may be attached to one of the support structures 112, 116 (not shown) of the seat back 115 and the seat bottom 120, respectively. The first anchor 135 may extend from one of the seat back 115 or the seat bottom 120. The first anchor 135 may include, as is known, a buckle to allow a latchplate connected to the webbing 145 to engage with the first anchor 135.

The seat belt assembly 125 includes the second anchor 140. The second anchor 140 secures the webbing 145 to the seat 110 opposite the first anchor 135, providing the third of the 3-point belt system. The second anchor 140 may be installed and/or integrated into at least one of the seat back 115 and/or the seat bottom 120. That is, the second anchor 140 may be attached to one of the support structures 170, 180 of the seat back 115 and the seat bottom 120, respectively. The second anchor 140 may extend from one of the seat back 115 or the seat bottom 120.

The seat belt assembly 125 includes the webbing 145. The webbing 145 secures the occupant to the seat back 115 and the seat bottom 120, and, when secured by the retractor 130, the first anchor 135, and second anchor 140, absorbs energy from movement of the occupant during an impact. The webbing 145 may be constructed of, e.g., a fabric, a polymer, a composite, etc. The webbing 145 may be a unitary construction or include several pieces, e.g., a pair of straps each connected to the first anchor 135.

The webbing 145 may include a shoulder strap 150 and a belt strap 155. When the seat belt assembly 125 is buckled, i.e., the webbing 145 is secured to the first anchor 135, the shoulder strap 150 extends from the retractor 130 to the first anchor 135, placing the shoulder strap 150 across an upper torso of a vehicle occupant. The belt strap 155 may extend across the lower torso of the occupant from the first anchor 135 to the second anchor 140. The shoulder strap 150 and the belt strap 155 may be two separate pieces of the webbing 145, or may be a unitary piece of the webbing 145.

The seat belt assembly 125 includes at least one airbag 160. The airbag 160 inflates during an impact to absorb some impact energy that would otherwise be applied to the occupant. The airbag 160 may be constructed of, e.g., a fabric, a polymer, a composite, etc. The airbag 160 may be installed and/or integrated into the seat belt assembly 125. Specifically, the airbag 160 may be sewn or otherwise fastened to the webbing 145. The airbag 160 may be located between the first anchor 135 to one of the retractor 130 and the second anchor 140. The example of FIG. 3 illustrates two airbags 160: a first airbag 160a and a second airbag 160b. The first airbag 160a extends from the first anchor 135 to the retractor 130 and is incorporated with or otherwise fastened to the shoulder strap 150. The second airbag 160b extends from the first anchor 135 to the second anchor 140 and is incorporated or otherwise fastened to the belt strap 155. The seat belt assembly 125 may include any number of additional airbags 160.

The seat 110 may include at least one side airbag 165. The side airbag 165 is arranged to inflate during an impact to reduce the amount of energy applied to an occupant moving laterally relative to the seat 110 during the impact. The side airbag 165 may be installed in the seat back 115. For example, the side airbag 165 may be attached to the support structure 170 and inflate through the cushion 175. The seat 110 may include a plurality of side airbags 165 to absorb energy from the occupant's movements in several directions. e.g., the seat 110 may include a pair of side airbags 165 installed to the left and the right of the occupant to absorb energy as the occupant moves to the left or the right during an impact.

The airbags 160, 165 may each be in fluid communication with an inflator 190. The inflator 190 may be, e.g., a cold gas inflator. The inflator 190 may receive a control signal output from the computing device 105 to inflate the airbags 160, 165 upon detecting an impact. The seat 110 may include a plurality of inflators 190. The inflators 190 may be disposed in at least one of the seat back 115 and/or the seat bottom 120.

Because the seat belt assembly 125 is attached to the seat 110, the retractor 130 and the airbags 160, 165, can be actuated when the seat 110 is rotated to any angle θ, including in the rear-facing position where the occupant may not have the benefit of other airbags incorporated into the passenger compartment such as an airbag incorporated into a steering wheel. Thus, even when the seat 110 is in the rear-facing position when the computing device 105 detects an impact, the computing device 105 can send a signal to the retractor 130 to halt payout of the webbing 145, locking the occupant in place. The computing device 105 can also send a signal to the inflators 190 to inflate at least one of the first and second airbags 160 and/or the side airbag 165 depending on where relative to the vehicle 101 the impact occurred and the angle θ of rotation of the seat 110. By consulting, e.g., a look-up table, the computing device 105 may select one or more airbags 160, 165 to deploy based on the angle θ and the direction of the impact and output a control signal to one or more of the inflators 190 to inflate the selected airbags 160, 165.

Figure 4:
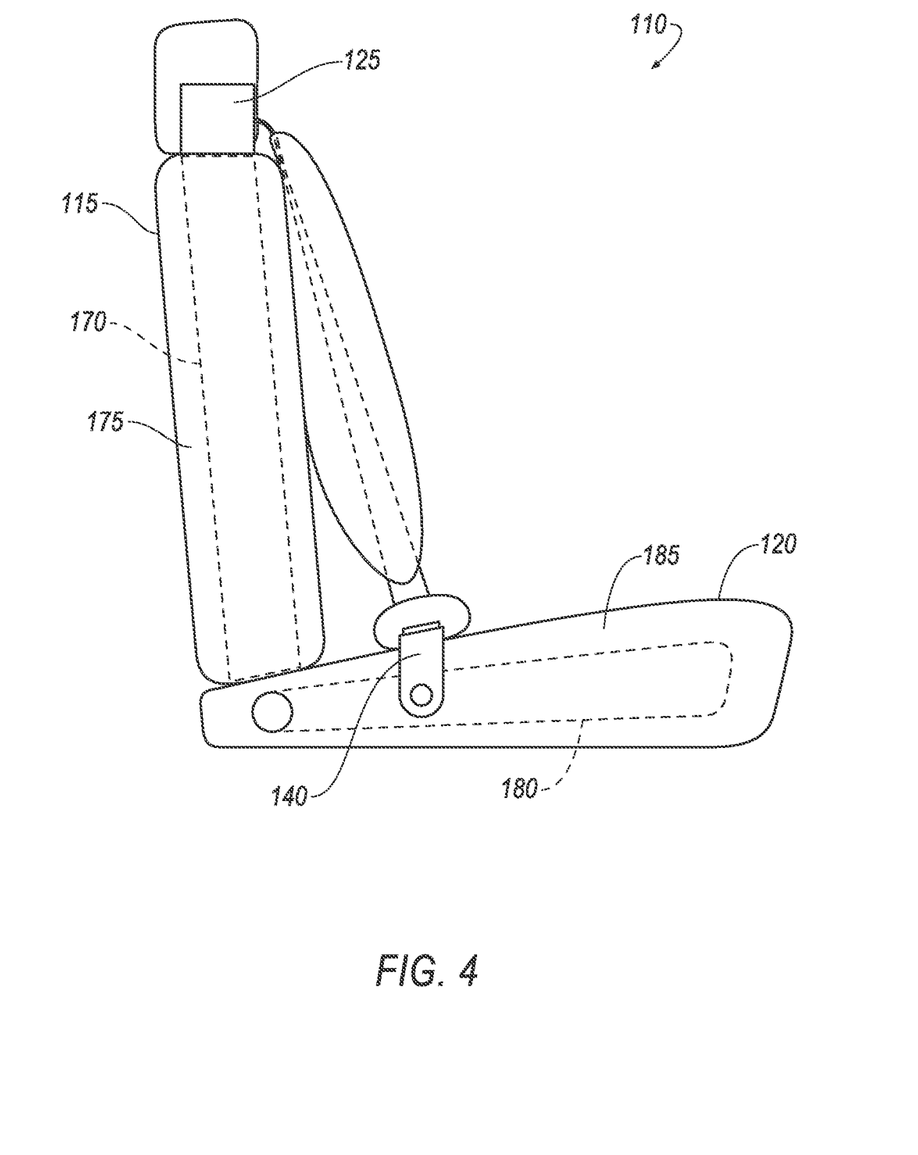
FIG. 4 is a side view of the example rotatable seat of FIG. 3.

FIG. 4 illustrates a side view of the seat 110. As described above, the seat back 115 includes the seat back structure 170 and the seat back cushion 175. The structure 170 extends along the length of the seat back 115 and is covered by the seat back cushion 175. The structure 170 may be constructed of, e.g., a metal, a polymer, a composite, etc. The retractor 130 may be attached to the structure 170 and extend out from the cushion 175. The side airbag 165 may also be attached to the structure 170 and deploy out from the cushion 175.

The seat 110 further includes the seat bottom 120. As described above, the seat bottom includes the seat bottom structure 180 and the seat bottom cushion 185. The structure 180 extends along the length of the seat bottom 120 and is covered by the seat bottom cushion 185. The first and second anchors 130, 135 may be attached to the structure 180 and extend out from the cushion 185. While not shown in FIG. 4, the side airbag 165 may be attached to the structure 180 and deploy out from the cushion 185 upon inflation.

Figure 5:
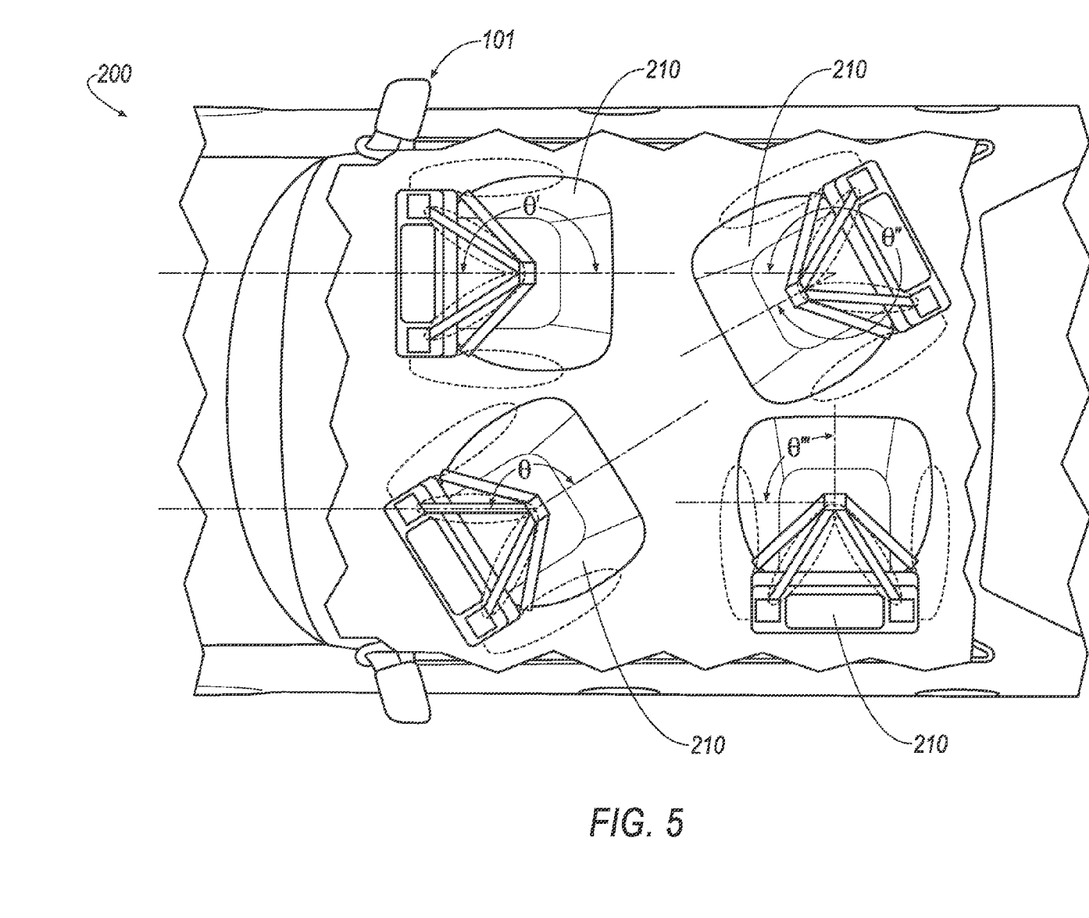
FIG. 5 in a plan view of a passenger compartment of another exemplary vehicle including rotatable seats.

FIG. 5 illustrates another example system 200 in a passenger compartment of a vehicle 101. The vehicle 101 includes multiple rotatable seats 210. The seats 210 may each be rotated to an angle θ about an axis relative to the vehicle floor. Each seat 210 may be rotated to a different angle θ, shown here as example angles θ, θ', θ", θ'". In the example of FIG. 5, the seats 210 each include a seat belt assembly 225 that is a 4-point harness with integrated airbags. In an autonomous vehicle 101, the seats 210 may rotate from a forward-facing position to a rear-facing position.

Figure 6:
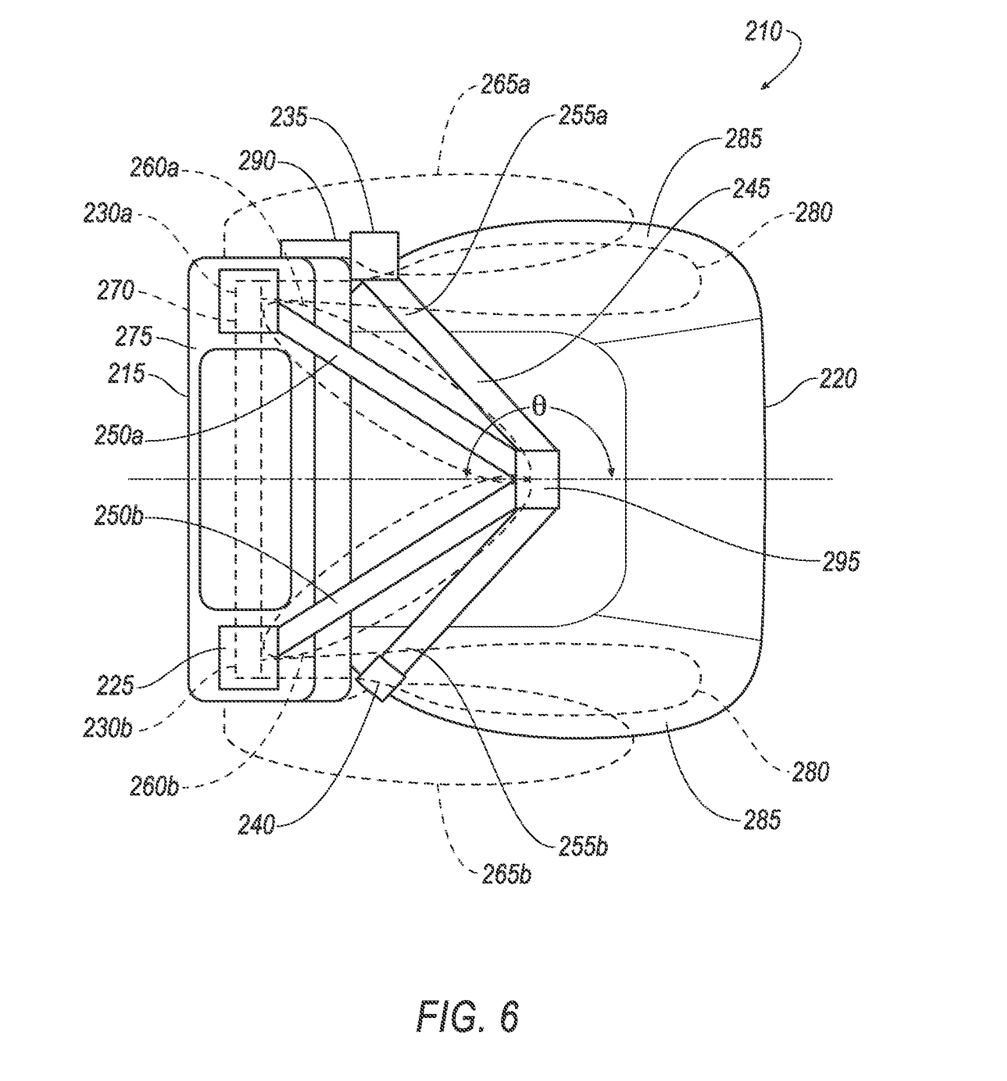
FIG. 6 is a plan view of an example rotatable seat that may be incorporated into the passenger compartment of the vehicle illustrated in FIG. 5.

FIG. 6 illustrates an exemplary rotatable seat 210, as shown in the vehicle 101 of FIG. 5. The seat 210 includes a seat back 215 and a seat bottom 220. The seat back 215 provides support for the vehicle occupant and may house at least part of a seat belt assembly 225. The seat back 215 includes a support structure 270 and a cushion 275 similar to the support structure 170 and cushion 175 described for the seat 110 above. The seat back 215 may rotate, with the seat bottom 220, about the axis to the angle θ.

The seat 210 further includes the seat bottom 220. The seat bottom 220 is attached to the seat back 215 and provides support for the vehicle occupant. The seat bottom 220 may house at least part of the seat belt assembly 225. The seat bottom 220 includes a support structure 280 and a cushion 285 similar to the seat bottom support structure 180 and the seat bottom cushion 185 for the seat 110 shown in FIG. 4. The seat bottom 220 may rotate about the axis to the angle θ.

The seat belt assembly 225 absorbs impact energy from the vehicle occupant and secures the occupant to the seat back 215 and seat bottom 220. The seat belt assembly 225 is a 4-point seat belt assembly, and includes a first retractor 230a, a second retractor 230b, a first anchor 235, a second anchor 240, a webbing 245, and a buckle 295. The seat belt assembly 225 may be installed at least in part in the seat back 215 and/or the seat bottom 220, e.g., connected to the support structure 270. The seat belt assembly 225 may extend at least partially from the seat back 215, e.g., through the cushion 275.

The seat belt assembly 225 includes the pair of retractors 230a, 230b (collectively, retractors 230) and are two of the four points in the 4-point belt system. The retractors 230 each house the webbing 245 and tighten the webbing 245 against the occupant, i.e., controls the payout of the webbing 245. For example, a first retractor 230a may control payout of a first shoulder strap 250a and a first belt strap 255a, and a second retractor 230b may control payout of a second shoulder strap 250b and a second belt strap 255b. The retractors 230 may be installed and/or integrated into the seat back 215. The retractors 230 may extend from the seat back 215. e.g., may be attached to the seat back support structure 270. The retractors 230 may be of a known type, e.g., a pretensioner.

The seat belt assembly 225 includes the first anchor 235. The first anchor 235 secures the webbing 245 to the seat 210 while allowing the webbing 245 to move to and from the retractor 230a. The first anchor 235 provides the third point of the 4-point belt system. That is, the first anchor 235 may secure the first belt strap 255a to the seat back 215 or the seat bottom 220. The first anchor 235 may be installed and/or integrated into at least one of the seat back 215 and/or the seat bottom 220. That is, the first anchor 235 may be attached to one of the support structures 270, 280 of the seat back 215 and the seat bottom 220. The first anchor 235 may extend from one of the seat back 215 or the seat bottom 220 out from the respective cushions 275, 285.

The seat belt assembly 225 includes the second anchor 240. The second anchor 240 secures the webbing 245 to the seat 210 while allowing the webbing 245 to move to and from the retractor 230b. The second anchor 240 provides the fourth point of the 4-point belt system. That is, the second anchor 240 may secure the second belt strap 255b to the seat back 215 or the seat bottom 220. The second anchor 240 may be installed and/or integrated into at least one of the seat back 215 and/or the seat bottom 220. That is, the second anchor 240 may be attached to one of the support structures 270, 280 of the seat back 215 and the seat bottom 220. The second anchor 240 may extend from one of the seat back 215 or the seat bottom 220 out from the respective cushions 275, 285.

The seat belt assembly 225 includes the webbing 245. The webbing 245 secures the occupant to the seat back 215 and the seat bottom 220, and, when secured by the retractors 230, the first anchor 235, the second anchor 240, and the buckle 295 absorbs energy from movement of the occupant during an impact. The webbing 245 may be constructed of, e.g., a fabric, a polymer, a composite, etc. The webbing 245 may be a unitary construction or include several pieces, e.g., a pair of straps each connected to the buckle 295.

The webbing 245 may include a first shoulder strap 250a, a second shoulder strap 250b, (collectively, straps 250) a first belt strap 255a, and a second belt strap 255b (collectively, straps 255). When the seat belt assembly 225 is buckled, i.e., the webbing 245 is secured to the buckle 295, the shoulder straps 250 extend from the respective retractors 230 to the respective first and second anchors 230, 235 placing the shoulder straps 250 across an upper torso of a vehicle occupant. The belt straps 255 may extend across the lower torso of the occupant from the respective first and second anchors 230, 235 to the buckle 295. The shoulder straps 250 and the belt straps 255 may each be separate pieces of the webbing 245, or the first shoulder strap 250a and the first belt strap 255a may be a first unitary piece of the webbing 245 (i.e., a first webbing 245), and the second shoulder strap 250b and the second belt strap 255b may also be a second unitary piece of the webbing 245 (i.e., a second webbing 245).

The seat belt assembly 225 includes the buckle 295. The buckle 295 secures the shoulder straps 250 and the belt straps 255 across the body of the vehicle occupant. The buckle 295 may include a plurality of slots to receive latchplates from the straps 250, 255. The buckle 295 may be permanently attached to the webbing 245, e.g., one of the straps 250, 255. The buckle 295 may connect the retractors 230 to the anchors 235, 240 with the webbing 245. As shown in FIG. 6, the first shoulder strap 250a extends from the first retractor 230a and is attached to the buckle 295 via, e.g., a latchplate. The first belt strap 255a extends from the first anchor 235 and is attached to the buckle 295. The second shoulder strap 250b extends from the second retractor 230b and is attached to the buckle 295, and the second belt strap 255b extends from the second anchor 240 to the buckle 295.

The seat belt assembly 225 includes at least one airbag 260. The airbag 260 inflates during an impact to absorb some impact energy that would otherwise be applied to the occupant. The airbag 260 may be constructed of, e.g., a fabric, a polymer, a composite, etc. The airbag 260 may be installed and/or integrated into the seat belt assembly 225. Specifically, the airbag 260 may be sewn or otherwise fastened to the webbing 245. The airbag 260 may be located, e.g., between the first retractor 230 and the buckle 295. The example of FIG. 6 illustrates two airbags 260: a first airbag 260a and a second airbag 260b (collectively, airbags 260). The first airbag 260a extends from the first retractor 230a to the buckle 295 and is incorporated with or otherwise fastened to the first shoulder strap 250a. The second airbag 260b extends from the second retractor 230b to the buckle 295 and is incorporated or otherwise fastened to the second shoulder strap 250b. The seat belt assembly 225 may include any number of additional airbags 250.

The seat 210 may include at least one side airbag 265. The side airbag 265 is arranged to inflate during an impact to reduce the amount of energy applied to an occupant moving laterally relative to the seat 210 during the impact. The side airbag 265 may be installed in the seat back 215. For example, the side airbag 265 may be attached to the support structure 270 and inflate through the cushion 275. The seat 210 may include a plurality of side airbags 265 to absorb energy from the occupant's movements in several directions. e.g., the seat 210 may include a pair of side airbags 265a, 265b (collectively, side airbags 265) installed to the left and the right of the occupant, respectively, to absorb energy as the occupant moves to the left or the right during an impact.

The airbags 260, 265 may each be in fluid communication with an inflator 290. The inflator 290 may be, e.g., a cold gas inflator. The inflator 290 may receive a control signal output from the computing device 105 to inflate the airbags 260, 265 upon detecting an impact. The seat 210 may include a plurality of inflators 290. The inflators 290 may be disposed in at least one of the seat back 215 and/or the seat bottom 220, e.g., attached to one of the support structures 270, 280.

Because the seat belt assembly 225 is attached to the seat 210, the retractors 230 and the airbags 260, 265, can be actuated when the seat 210 is rotated to any angle θ, including in the rear-facing position where the occupant may not have the benefit of other airbags incorporated into the passenger compartment such as an airbag incorporated into a steering wheel. Thus, even when the seat 210 is in the rear-facing position when the computing device 105 detects an impact, the computing device 105 can send a signal to the retractors 230 to halt payout of the webbing 245, locking the occupant in place. The computing device 105 can also send a signal to the inflators 290 to inflate at least one of the first and second airbags 260 and/or the side airbags 265 depending on where relative to the vehicle 101 the impact occurred and the angle θ of rotation of the seat 210. By consulting, e.g., a look-up table, the computing device 105 may select one or more airbags 260, 265 to deploy based on the angle θ and the direction of the impact and output a control signal to one or more of the inflators 290 to inflate the selected airbags 260, 265.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
a vehicle seat rotatable, about an axis perpendicular to a vehicle floor, from a forward-facing position to a rear-facing position, the seat including a seat bottom and a seat back;
a seat belt assembly at least partially extending from the seat back;
at least one airbag incorporated into the seat belt assembly and deployable when the vehicle seat is rotated to at least one of the rear-facing position and a position between the forward-facing position and the rear-facing position; and
a processor programmed to determine a vehicle seat position and to detect a vehicle impact and to output a control signal to an inflator to inflate the at least one airbag based on the vehicle seat position about the axis.

2. The system of claim 1, wherein the seat belt assembly includes a first anchor, a second anchor, and a retractor, wherein the first and second anchors extend from the seat bottom and the retractor extends from the seat back.

3. The system of claim 2, wherein the seat belt assembly includes a shoulder strap and a belt strap and wherein the at least one airbag includes a first airbag and a second airbag, wherein the first airbag is incorporated into the shoulder strap and the second airbag is incorporated into the belt strap.

4. The system of claim 3, wherein the shoulder strap extends from the retractor to the first anchor and the belt strap extends from the first anchor to the second anchor.

5. The system of claim 4, wherein the shoulder strap and the belt strap are formed from a unitary webbing and the first and second airbags are integrated into the webbing.

6. The system of claim 4, further comprising a third airbag, the third airbag being a side airbag supported by the seat.

7. The system of claim 1, further comprising an inflator disposed in at least one of the seat back and the seat bottom, wherein the inflator is in fluid communication with the at least one airbag.

8. The system of claim 1, wherein the processor is further programmed to output the control signal to the inflator in response to detecting the vehicle seat in at least one of the rear-facing position and the position between the forward-facing position and the rear-facing position and the vehicle impact.

9. The system of claim 8, wherein the inflator is configured to inflate the at least one airbag in response to receiving the control signal output by the processor.

10. The system of claim 2, further comprising a second retractor and a buckle, wherein the webbing includes a first webbing and a second webbing, the buckle connecting the first webbing, the retractor, and the first anchor, and connecting the second webbing, the second retractor, and the second anchor.

11. A seatbelt assembly comprising:
a webbing forming a shoulder strap and a belt strap;
at least one airbag incorporated into at least one of the shoulder strap and the belt strap; and
a processor programmed to determine a vehicle seat position, including a forward-facing position and a rear-facing position, wherein the processor is programmed to output a control signal in response to the vehicle seat being in at least one of the rear-facing position and a position between the forward-facing position and the rear-facing position and in response to detecting a vehicle impact, wherein the control signal causes the at least one airbag to inflate.

12. The seatbelt assembly of claim 11, wherein the seatbelt assembly includes a first anchor, a second anchor, and a retractor, wherein the shoulder strap extends from the retractor to the first anchor and wherein the belt strap extends from the first anchor to the second anchor.

13. The seat belt assembly of claim 12, further comprising a second retractor and a buckle, wherein the webbing includes a first webbing and a second webbing, the buckle connecting the first webbing, the retractor, and the first anchor, and connecting the second webbing, the second retractor, and the second anchor.

14. The seatbelt assembly of claim 11, wherein the at least one airbag includes a first airbag and a second airbag, and the first airbag is integrated into the shoulder strap and the second airbag is integrated into the belt strap.

15. The seatbelt assembly of claim 11, wherein the processor is programmed to output the control signal to an inflator in fluid communication with the at least one airbag.

16. A system, comprising:
a vehicle seat rotatable, about an axis perpendicular to a vehicle floor, from a forward-facing position to a rear-facing position, the seat including a seat bottom and a seat back;
a seat belt assembly at least partially extending from the seat back including a first anchor, a second anchor, and a retractor;
a first airbag and a second airbag incorporated into the seat belt assembly and deployable when the vehicle seat is rotated to at least one of the rear-facing position and a position between the forward-facing position and the rear-facing position;
an inflator disposed in at least one of the seat back and the seat bottom; and
a processor programmed to determine a vehicle seat position and a vehicle impact and output a control signal to the inflator in response to detecting the vehicle seat in at least one of the rear-facing position and the position between the forward-facing position and the rear-facing position and the vehicle impact;

wherein the first and second anchors extend from the seat bottom and the retractor extends from the seat back;

wherein the seat belt assembly includes a shoulder strap and a belt strap and wherein the first airbag is incorporated into the shoulder strap and the second airbag is incorporated into the belt strap;

wherein the inflator is in fluid communication with at least one of the first and second airbags and configured to inflate at least one of the first and second airbags in response to receiving the control signal output by the processor.

17. The system of claim 16, wherein the shoulder strap extends from the retractor to the first anchor and the belt strap extends from the first anchor to the second anchor.

18. The system of claim 17, wherein the shoulder strap and the belt strap are formed from a unitary webbing and the first and second airbags are integrated into the webbing.

19. The system of claim 17, further comprising a third airbag, the third airbag being a side airbag supported by the seat.

* * * * *